United States Patent [19]

Gray

[11] Patent Number: 4,894,286
[45] Date of Patent: Jan. 16, 1990

[54] OXIDATION RESISTANT REFRACTORY COATED CARBON-CARBON COMPOSITES

[75] Inventor: Paul E. Gray, La Costa, Calif.

[73] Assignee: Rohr Industries, Inc., Chula Vista, Calif.

[21] Appl. No.: 268,015

[22] Filed: Nov. 7, 1988

[51] Int. Cl.[4] .......................... B32B 9/00; B32B 31/00
[52] U.S. Cl. ..................................... 428/408; 427/228; 427/299; 427/402; 428/366; 428/367; 428/446; 428/450; 428/688; 428/689; 428/697; 428/698; 428/699; 428/704; 428/902
[58] Field of Search ............... 428/368, 408, 688, 689, 428/697, 698, 699, 704, 702, 241, 242, 244, 267, 266, 366, 367, 450, 446; 427/228, 402, 299

[56] References Cited

U.S. PATENT DOCUMENTS

| | | | |
|---|---|---|---|
| 3,364,152 | 1/1968 | Lipp | 252/478 |
| 3,672,936 | 6/1972 | Ehrenreich | 428/408 |
| 4,101,354 | 7/1978 | Shaffer | 156/60 |
| 4,321,298 | 3/1982 | Shaffer et al. | 428/242 |
| 4,339,021 | 7/1982 | Kosuda et al. | 191/50 |
| 4,429,003 | 1/1984 | Fredriksson et al. | 428/317.9 |
| 4,668,579 | 5/1987 | Strangmann et al. | 428/368 |
| 4,795,677 | 1/1989 | Gray | 428/246 |

Primary Examiner—Ellis P. Robinson
Assistant Examiner—Archene A. Turner
Attorney, Agent, or Firm—Patrick J. Schlesinger

[57] ABSTRACT

An oxygen resistant high temperature composite structure comprises a carbonous matrix and reinforcing high temperature fibers disposed within said matrix, an outer refractory coating covering said matrix, boron, in elemental form and/or as a moiety of a compound dispersed throughout said structure, silicon, in elemental form and/or as a moiety of a compound dispersed throughout said structure, and titanium, in elemental form and/or as a moiety of a compound dispersed throughout said structure, said silicon and said boron oxidizing when exposed to a high temperature, oxidizing environment to form silicon oxide and boron oxide, and said titanium forming titanium oxide which stabilizes the molten phase of the boron oxide. Microcracks which form in the refractory coating are sealed by a molten glass which forms from oxidation of the boron, silicon and titanium, thereby preventing oxidation degradation of the underlying matrix.

12 Claims, 2 Drawing Sheets

OXIDATION RESISTANT REFRACTORY COATED CARBON-CARBON COMPOSITES

BACKGROUND OF THE INVENTION

The present invention relates to oxidation resistant carbon/carbon composites and pertains particularly to improved oxidation resistant sealants for such composites.

Materials having high strength to weight ratios are in great need for operation under severe conditions in ranges of temperatures in the thousands of degrees F. Jet engines for example now operate at temperatures of several thousands of degrees F., and are expected to operate at these temperatures with high reliability and minimum maintenance. Materials used in these applications must be capable of withstanding corrosion and erosion at elevated temperatures for long periods of time. They must be hard, tough and wear resistant at these elevated temperatures.

Carbon/carbon composites have been known for some time, and are desirable in applications wherein high strength to weight ratio at elevated temperatures is desired. Such composites have been developed in recent years with oxidation resistant coatings for use in high temperature environments. Carbon/carbon composites typically include a carbonous matrix formed by carbonization of a carbon char-yielding material. Carbon or other fibers are typically incorporated in the a carbon matrix so as to reinforce the same. These materials are formed in many ways, for example by impregnating graphite cloth with a carbon char-yielding material, and then carbonizing the impregnate through the application of heat and pressure.

Prior carbon/carbon composites have utilized an in-depth particulate addition to the carbon matrix, with an external refractory coating to prevent oxidation of the composite at high temperatures. The particulates consist of metal alloy or metal carbide powders which do not appreciably react to the carbon fibers or matrix. The external coating forms a primary oxygen barrier and is oxidation resistant. Examples of these coatings are silicon carbide (SiC) or silicon nitride ($Si_3N_4$). These coatings are usually applied by chemical vapor deposition (CVD). However, due to the inherently low coefficient of thermal expansion of the carbon/carbon and the elevated coating deposition temperatures, the CVD coating becomes microcracked. At temperatures above which carbon oxidizes (500 degree C.), these microcracks serve as paths for oxygen ingress, allowing the carbon fibers and matrix to oxidize.

If the coating could be made crack free, either by raising the expansion coefficient of the substrate, or lowering the expansion coefficient of the coating, the matrix and fibers would be protected from oxidation. Alternatively, filling the microcracks in the carbon/carbon coating with a viscous sealant material which will flow, accommodating changes in the crack dimension with temperature, will also protect the matrix and fibers from oxidation. Attempts at this latter solution have been proposed in the past. In my co-pending application Ser. No. 805,887, filed Dec. 6, 1985, I disclose "Oxidation-Inhibited Carbonous Materials" that utilize a binary system of boron and a metal or metalloid which oxidizes at high temperatures to form a sealant of boron oxide-based glass. The metal or metalloid oxide is partially soluble in boron oxide and stabilizes the viscosity of the boron oxide at high temperatures. Prior attempts to solve the oxidation problem by sealing the microcracks have not been completely satisfactory at certain temperatures.

SUMMARY OF THE INVENTION

It is the primary object of the present invention to provide an improved oxidation resistant carbon/carbon composite.

In accordance with a primary aspect of the present invention, a refractory coated carbon/carbon matrix is with an added composition of $nTiO_2 \cdot xSiO_2$. provided with an added composition of $nTiO_2 \cdot xSiO_2 \cdot yB_2O_3$. In high temperature environments, microcracks which form in the refractory coating are sealed by a molten glass which forms from the composition, thereby preventing oxidation degradation of the underlying matrix.

BRIEF DESCRIPTION OF THE DRAWING

The above and other objects and advantages of the present invention will become apparent from the following description when read in conjunction with the drawings wherein.

DESCRIPTION OF THE PREFERRED EMBODIMENTS

The entire disclosure of my prior U.S. patent application Ser. No. 805,887, filed Dec. 6, 1985, entitled "Oxidation-Inhibited Carbonous Materials" is hereby incorporated by reference.

Figure 1:
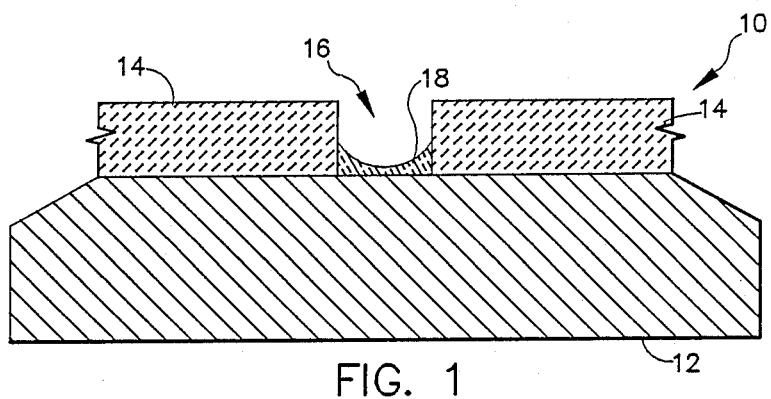
FIG. 1 is an elevation view in section schematically illustrating a substrate with a cracked coating sealed in accordance with the present invention.

Referring to FIG. 1 of the drawings, a composite structure, designated generally by the numeral 10, comprises a substrate 12 in which high temperature fibers are preferably embedded to reinforce the carbonous matrix. The proportions in FIG. 1 are exaggerated. This composite structure is protected from oxidation by an outer refractory coating of silicon carbide or silicon nitride 14 which is applied to the carbon matrix by a chemical vapor deposition (CVD) process. As a result of differential expansion between the coating and the substrate, cracks 16 develop in the coating. The present invention, as in my previous application, involves the provision of materials in the substrate of the composite structure which respond to oxidation to form a sealant glass to seal cracks, micropores and the like in the protective coating of the composite structure. In accordance with the present invention, a viscous glass 18 resulting from the oxidation of particles of boron, silicon and titanium within the substrate forms a sealant that flows into the cracks 16, covering the normally exposed substrate surface, to thereby prevent oxygen ingress into the substrate.

The substrate 12 is preferably a fiber reinforced carbonized matrix. However, where high strength is not required, reinforcing fibers may be omitted. The carbonized matrix may be formed by carbonizing carbon char-yielding materials in which are preferably disposed suitable reinforcing high temperature fibers. The carbon char-yielding materials may, for example, be phenolic, epoxy, furan and polyimide resins, pitches, pitch derivatives and individual pitch constituents.

Additional carbon typically added to the matrix to reduce porosity and increase strength may be added by impregnating the composite with a char-yielding material or by decomposing a hydrocarbon gas, such as methane within the matrix porosity directly depositing carbon. The latter technique is commonly referred to as chemical vapor infiltration (CVI).

Where high strength and reinforcing is required, high temperature fibers formed of various materials, including carbon, metal or metaloid carbides, metaloid borides in metal, or metaloid nitrides may be embedded in a woven or non-woven manner in the matrix. Other suitable fibers include carbon and graphite, silicon carbides, silicon nitride and mixtures of fibers.

The most common fiber used in high temperature composites is carbon, including graphite. Reinforcing carbon fibers may be either preformed carbon or graphite fibers or may be fibers of a material such as a polyacrylonitrile, rayon or pitch, that carbonizes when subjected to high temperatures. Reinforcing high temperature fibers are incorporated and arranged in a manner that adequately reinforces the matrix. These may be woven into sheets forming a cloth or may be individual fibers, such as whiskers, arranged in a non-woven fabric or mat so as to best reinforce the composite for the intended purpose.

When structures formed of these composite materials are subjected to extremely high temperatures, for example those encountered in the exhaust gas stream of a jet engine, oxygen which comes into contact with the carbon matrix or reinforcing fibers degrades the structure. In order to protect such structures from oxidation, materials are incorporated in the matrix which form a sealant glass which wicks into the cracks in the refractory coating from within the substrate. The present invention provides a specific family of sealant glasses which have desirable properties for sealing the surface microcracks of the carbon/carbon composite structure. The preferred sealant composition, in accordance with the invention, has the nominal formula $10TiO_2 \cdot 20SiO_2 \cdot 70B_2O_3$. This system was developed to overcome the deficiencies of binary systems such as disclosed in my prior application.

Pure $B_2O_3$ provides a good sealant phase for protecting carbon/carbon for oxidation at moderate (1000 degrees C., 1832 degrees F.) temperatures but suffers from a high vapor pressure at temperatures of 1400 degrees C. (2550 degrees F.), a poor moisture resistance at ambient temperatures, a tendency to galvanically corrode SiC coating at high temperatures, and low viscosity at high temperatures.

According to the present invention, the high solubility of $TiO_2$ n $B_2O_3$ is utilized to prevent volatilization of the $B_2O_3$ and increase the sealant viscosity over a wide temperature range. The $SiO_2$ component acts to increase the moisture resistance of the glass at ambient temperatures, reduce the $B_2O_3$ volatility at high temperatures, increase the overall viscosity of the sealant and prevent galvanic corrosion of the SiC at high temperatures by the $B_2O_3$.

The oxidation protection described herein is provided by means of a boron-silicon glass which is viscosity stabilized over a broad range of temperatures by means of a refractory oxide, which in the present case is preferably titanium oxide. This protection is provided by the provision of particles of, or containing, boron, silicon and titanium in the matrix material that is initially formed. The initially formed matrix after carbonization of the char-yielding material contains substantially no boron oxide, silicon oxide or refractory oxide. The matrix material contains metallic boron, silicon and the titanium, which are preferably in particle form such that the protective glass composition eventually forms from these materials in the matrix. The oxide forms the glass as a result of the oxidation of these materials at high temperatures.

Figure 2:
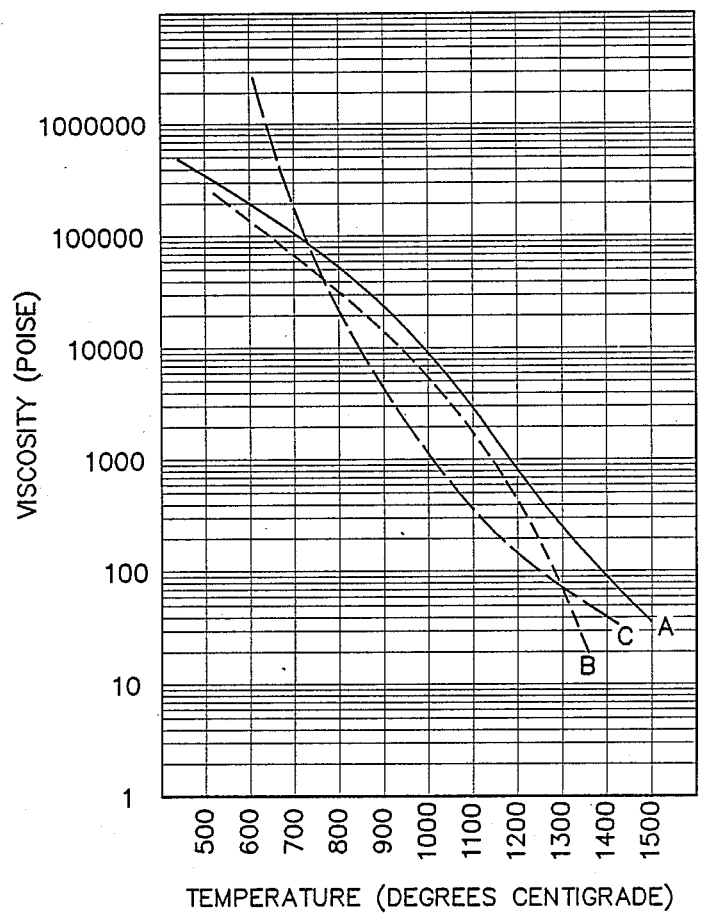
FIG. 2 is a semi-log graph showing a viscosity stabilizing effect of the proportions of the composition in accordance with the invention.

The nominal sealant phase, as described herein with a composition of $10TiO_2 \cdot 20SiO_2 \cdot 70B_2O_3$, 02 $20SiO2$ $70B2O3$, is specific for coated carbon/carbon articles designed to operate in the range of temperatures from about 456 degrees C. to about 1430 C. Increasing the $TiO_2/B_2O_3$ ratio has the effect of reducing the high temperature viscosity of the sealant, as shown by line B in FIG. 2. Line A shows the nominal or preferred composition, which exhibits a more stable viscosity over a higher temperature range in the vicinity of 1300 to 1500 degrees C. Increasing the $SiO_2/B_2O_3$ ratio causes the low temperature viscosity to increase rapidly which would be deleterious to oxidation performance in the 500–800 degrees C. range (932–1472 degrees F.), as shown in FIG. 2 by the line C. This ratio gives a much higher viscosity at the lower temperature ranges.

Increasing the total $(Si+Ti)/B$ ratio much above 0.210 is not desirable since the overall glass viscosity would be raised, preventing useful viscous flow near the 500 degree C. (932 degrees Fahrenheit) range. Decreasing the $Si+Ti/B$ ratio below 0.170 causes a low sealant viscosity at high temperatures, excessive $B_2O_3$ volatility and poorer moisture resistance at ambient temperatures.

All glasses spanning the specific composition range of between $0.170 \leq (Ti+Si)/B > 0.210$ have been determined to satisfactorily wet the carbonous matrix and fibers in these temperature ranges. The wetting behavior of these glasses have been evaluated by the sessile drop technique.

The composition of the matrix inhibitor changes, if and when various species within the matrix are oxidized. It is intended that no oxidizing atmosphere reach the interstices of the matrix, particularly if the matrix is coated with a seal coat and with an outer refractory coating. However, should these areas be exposed to high temperature, oxidizing environment due to cracks and the like in the outer refractory coating, the boron, silicon and titanium are available for forming the viscosity stabilized boron-silicon based glass. The initial protection of the matrix and fibers by the boron, silicon and metal within the matrix is by scavenging oxygen that would otherwise oxidize the carbon in the matrix or oxidize reinforcing fibers. The protection is due to the free energy of formation of the boron, silicon and titanium oxides being substantially less than carbon monoxide. Thus, the oxygen which leaks through preferentially oxidizes the B, Si+Ti.

In providing the oxidization protection, the oxides of the materials each occupy substantially more volume by a factor of about three than the precursors of the boron, titanium, and silicon. Thus, oxidation of the precursor moieties within any crack or pore of the carbonized matrix swells the filler material to a volume so that substantially all of the crack and pore volume becomes occupied by the boron-silicon glass system.

The silicon, titanium, and boron metals are introduced into the carbon/carbon composite by adding these fillers to the resin systems as particulates during the prepregging operation. The particles are preferably small (one to two microns) to get into interstices in the fiber bundle. Primary considerations in the introduction of these materials include filler content, filled resin rheology, and reactivity of the filler powders with the carbon fibers and matrix during high temperature processing. These materials are preferably selected so that they react with carbon from the matrix and form a reaction bond. As an example, a prepregging resin was prepared from the following powders:

| POWDER | WT % | PARTICLE SIZE |
|---|---|---|
| $Ti_5Si_3$ | 24.54 | 325 mesh |
| SiC | 10.64 | 600 mesh |
| $SiB_6$ | 24.67 | 325 mesh |
| B | 40.15 | Sub-micron |

These quantities were added to thirty-five parts by weight inhibitor, sixty-five parts SC-1008 phenolic resin resin and ten parts alcohol (ethanol or methanol) and mixed in a high shear mixer. The resin powder mixture was then prepregged into plies of thermally stabilized T-300 8-harness satin fabric. The prepregged fabric plies were then laid up, cured and then carbonized and densified using pitch-furfural resin.

Figure 3:
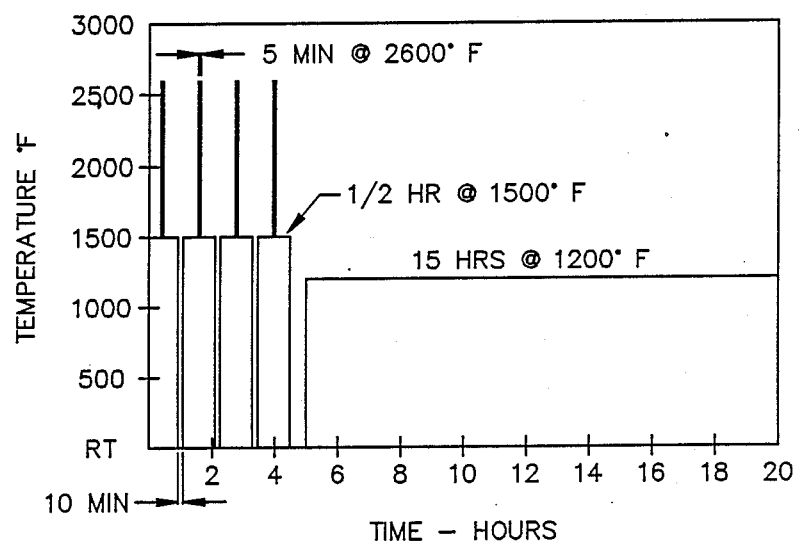
FIG. 3 is a graph illustrating an oxidation screening cycle with temperature and time shown in hours.
Figure 4:
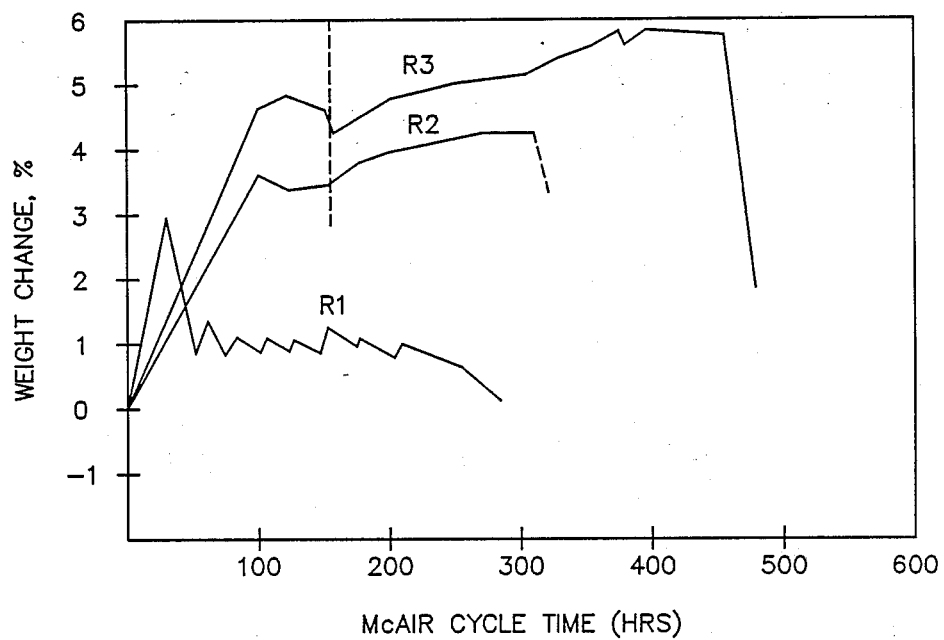
FIG. 4 is a plot showing a weight change for different samples screened in accordance with the screening cycle illustrated in FIG. 3.

After carbon/carbon densification processing, the substrate material was CVD coated with silicon-rich SiC by Chromalloy R&T. The coated coupon was subject to the thermal cycle shown in FIG. 3. This graph of the cycle shows heating the sample to 1500 degrees F. (815 degrees C.) for one-half hour, then to 2600 degrees F. (1427 degrees C.) for five minutes, cooling to 1500 degrees F. (815 degrees C.) and maintaining it for one-half hour before cooling the room temperature. This cycle was repeated at ten minute intervals for four complete cycles. The sample was then heated to and maintained at 1200 degrees F. (649 degrees C.) for a period of fifteen (15) hours. Weighings of the part were made at each point within the cycle when the part was cooled to room temperature. The three parts were tested and the resultant time/weight loss data are presented in graph form in FIG. 4. It should be noted that samples R2 and R3 which had the SiSiC coatings exhibited no weight loss for three-hundred twenty-seven and four-hundred seventy hours, respectively. The R1 sample exhibited a weight loss after an initial gain.

The glass formed by the process of the present invention forms a seal coat that flows into microcracks in the outer refractory coating, maintaining a protective seal against oxidation of the carbon matrix. Whereas the fillers in the carbonous matrix may never be exposed to oxygen and therefore remain unoxidized during most of the life of the component formed from the structural material, some degree of oxidization of the fillers within the seal coat is expected to occur. The $TiO_2$. $SiO_2$. $B_2O_3$ glass, which is molten at elevated temperatures, flows into the cracks which develop in the outer coating sealing them. The effect is promoted by the reaction of the precursors in cracks that develop by oxidizing to form the glass, and the glass expanding forcing its way into the cracks of the outer refractory coating.

The refractory oxide must adequately stabilize the viscosity of the protective glass within the use temperature range, assuring that the viscosity does not drop below about one-hundred poise as measured by the torsional vibrational technique in order to prevent the melt from flowing off the carbonous surfaces, thereby failing to protect the carbonous material from oxidation.

It is apparent from the foregoing discussion that I have discovered and developed a specific family of glass sealants which have desirable properties for sealing microcracks in refractory coatings of carbon/carbon structures. I have also discussed and developed methods for incorporating metallic precursors of these sealants into carbon/carbon structures. The metallic precursors in particulate form in the carbon matrix from an oxygen getter which oxidizes before the fibers and matrix, thus preserving structural integrity. The molar volume of the metallic particles increases with oxidation, forcing the resulting sealant glass into cracks formed in the structure refractory coating. The composite has the capacity to continuously produce sealant glass as needed to heal and seal off major breaks in the refractory (SiC, $Si_3N_4$) coating.

While my invention has been disclosed and illustrated with reference to specific embodiments, it is to be understood that the principals involved are susceptible for use in numerous other embodiments which will be apparent to persons skilled in the art. Accordingly, the protection afforded my invention should only be limited in accordance with the scope of the following claims.

I claim:

1. An oxygen resistant high temperature structure comprising:
   a carbonous matrix;
   an outer refractory coating over said matrix;
   silicon, in elemental form and/or as a moiety of a compound dispersed throughout said matrix;
   boron, in elemental form and/or as a moiety of a compound dispersed throughout said matrix;
   titanium, in elemental form and/or as a moiety of a compound dispersed throughout said matrix;
   said silicon and said boron oxidizing when exposed to a high temperature oxidizing environment to form silicon oxide and boron oxide; and
   said titanium forming titanium oxide stabilizing a molten phase of the boron oxide wherein the composition range is about $0.170 \leq (Ti+Si)/B < 210$.

2. An oxygen resistant composite according to claim 1 wherein the composition is about $10TiO_2$. $20SiO_2$. $70B_2O_3$.

3. An oxygen resistant composite according to claim 1 wherein said matrix includes reinforcing fibers disposed therethrough.

4. An oxygen resistant composite according to claim 1 wherein said outer refractory coating is selected from the group consisting of silicon, silicon carbide, silicon nitride, aluminum nitride, and silicon boride.

5. An oxygen resistant composite according to claim 4 wherein the composition is about $10TiO_2$. $20SiO_2$. $70B_2O_3$.

6. An oxygen resistant high temperature composite structure comprising:
   a carbonous matrix including reinforcing high temperature fibers disposed within said matrix;
   an outer refractory coating covering said matrix;
   boron, in elemental form and/or as a moiety of a compound dispersed throughout said matrix;
   silicon, in elemental form and/or as a moiety of a compound dispersed throughout said matrix; and
   titanium, in elemental form and/or as a moiety of a compound dispersed throughout said matrix, said silicon and said boron oxidizing when exposed to a high temperature, oxidizing environment to form silicon oxide and boron oxide, and said titanium forming titanium oxide which stabilizes the molten phase of boron oxide which forms wherein the composite range is about $0.1700 \leq (Ri+Si)/B < 0.210$.

7. An oxygen resistant composite according to claim the composition is about $10TiO_2.20SiO_2.70B_2O_3$.

8. An oxygen resistant composite according to claim 7 wherein said outer refractory coating is selected from the group consisting of silicon, silicon carbide, silicon nitride, aluminum nitride, and silicon boride.

9. A method of forming an oxygen resistant high temperature structure comprising:

selecting a carbon-char yielding material, dispersing boron in elemental form and/or as a moiety of a compound throughout said material, dispersing silicon in elemental form and/or as a moiety of a compound throughout said material, dispersing titanium, in elemental form and/or as a moiety of a compound throughout said material;

heating said char-yielding material under pressure to carbonize the same, thereby forming a carbonous matrix;

applying an outer refractory coating to said carbonous matrix;

said boron, silicon and titanium being dispersed within the range of about $0.170 \leq (Ti+Si)/B < 0.210$, said boron and said silicon oxidizing when exposed to a high temperature, oxidizing environment forming boron oxide and silicon oxide, and said titanium forming titanium oxide which stabilizes the molten phase of boron oxide which forms.

10. An oxygen resistant composite according to claim 9 wherein the composition of boron, silicon, and titanium in a range of about $1O_2.20SiO_2.70B_2O_3$.

11. A method of forming an oxygen resistant high temperature structure comprising:

selecting a carbon-char yielding material, dispersing reinforcing graphite fibers throughout said material, dispersing boron in elemental form and/or as a moiety of a compound throughout said material, dispersing silicon in elemental form and/or as a moiety of a compound throughout said material, dispersing titanium, in elemental form and/or as a moiety of a compound throughout said material;

heating said char-yielding material under pressure to carbonize the same, thereby forming a carbonous matrix; and applying an outer refractory coating to said matrix constructed of material selected from the group consisting of silicon, silicon carbide, silicon nitride, aluminum nitride, and silicon boride, said boron, silicon and titanium being dispersed within the range of about $0.170 \leq (Ti+Si)/B < 0.210$, said boron and said silicon oxidizing when exposed to a high temperature, oxidizing environment forming boron oxide and silicon oxide, and said titanium forming titanium oxide that stabilizes the molten phase of boron oxide which forms.

12. An oxygen resistant composite according to claim 11 wherein the composition of boron, silicon, and titanium in a range of abouat $10TiO_2.20SiO_2.70B_2O_3$.

* * * * *